United States Patent
Takikawa

(10) Patent No.: US 11,710,217 B2
(45) Date of Patent: *Jul. 25, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoichi Takikawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 171 days.

This patent is subject to a terminal disclaimer.

(21) Appl. No.: 17/168,033

(22) Filed: Feb. 4, 2021

(65) Prior Publication Data

US 2021/0256662 A1 Aug. 19, 2021

(30) Foreign Application Priority Data

Feb. 13, 2020 (JP) ................... 2020-022179

(51) Int. Cl.
*G06T 5/00* (2006.01)
*G06V 10/30* (2022.01)

(52) U.S. Cl.
CPC .............. *G06T 5/002* (2013.01); *G06V 10/30* (2022.01)

(58) Field of Classification Search
CPC ........... G06T 5/002; G06T 2207/20021; G06T 2207/20076; G06T 5/00; G06T 5/001; G06T 5/003; G06T 5/005; G06T 5/008; G06T 5/009; G06T 7/337; G06T 7/223; G06T 2207/20182; G06T 2207/20172; G06V 10/60; G06V 10/751; G06V 10/30; G06V 30/164; G06K 7/10851; H04N 1/4078; H04N 1/58; H04N 5/213; H04N 5/357; H04N 5/911

See application file for complete search history.

(56) References Cited

U.S. PATENT DOCUMENTS

| | | | |
|---|---|---|---|
| 9,342,873 B1* | 5/2016 | Barron | G06T 7/223 |
| 11,508,039 B2* | 11/2022 | Takada | G06T 5/002 |
| 2008/0158146 A1* | 7/2008 | Westerman | G06T 7/41 |
| | | | 382/209 |
| 2008/0158147 A1* | 7/2008 | Westerman | G06V 40/107 |
| | | | 382/209 |
| 2011/0243428 A1* | 10/2011 | Das Gupta | G06T 5/002 |
| | | | 382/162 |

(Continued)

OTHER PUBLICATIONS

Marc Lebrun et al.; "Implementation of the Non-Local Bayes (NL-Bayes) Image Denoising Algorithm;" IPOL Image Processing On Line; 3 (2013), pp. 1-42., http://dx.doi.org/10.5201/ipol.2013.16.

*Primary Examiner* — Jose L Couso
(74) *Attorney, Agent, or Firm* — Canon U.S.A., Inc. IP Division

(57) ABSTRACT

In an apparatus, it is determined whether a covariance matrix calculated based on a plurality of patches is abnormal. In a case where it is determined that the covariance matrix is not abnormal, the covariance matrix is used to perform first correction on pixels included in the plurality of patches. In a case where it is determined that the covariance matrix is abnormal, second correction, which is different from the first correction, is performed on the pixels included in the plurality of patches.

20 Claims, 9 Drawing Sheets

(56) References Cited

U.S. PATENT DOCUMENTS

| | | | | |
|---|---|---|---|---|
| 2014/0355899 A1* | 12/2014 | Jin | G06T 5/005 | 382/254 |
| 2015/0036938 A1* | 2/2015 | Kim | G06T 7/74 | 382/201 |
| 2015/0213583 A1* | 7/2015 | Rastegari | G06T 5/005 | 382/275 |
| 2015/0310295 A1* | 10/2015 | Wang | G06T 5/001 | 382/197 |
| 2015/0371108 A1* | 12/2015 | Senzaki | H04N 1/4092 | 382/197 |
| 2016/0165178 A1* | 6/2016 | al-Salem | G06T 5/009 | 348/441 |
| 2017/0076170 A1* | 3/2017 | Tuzel | G06N 5/003 | |
| 2018/0315172 A1* | 11/2018 | Smirnov | G06T 7/0002 | |

* cited by examiner

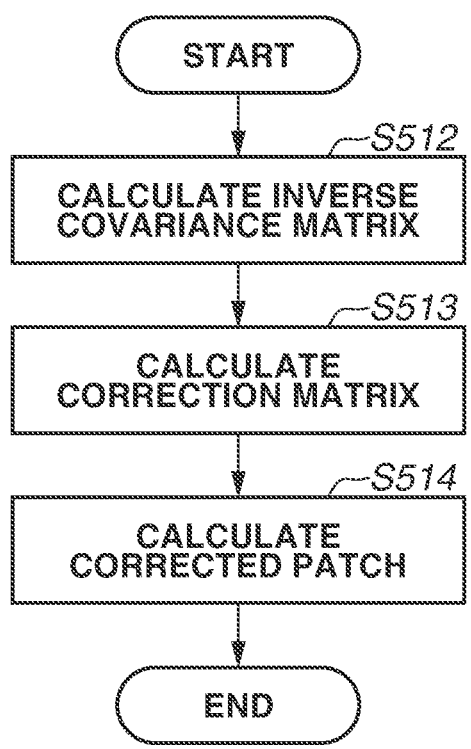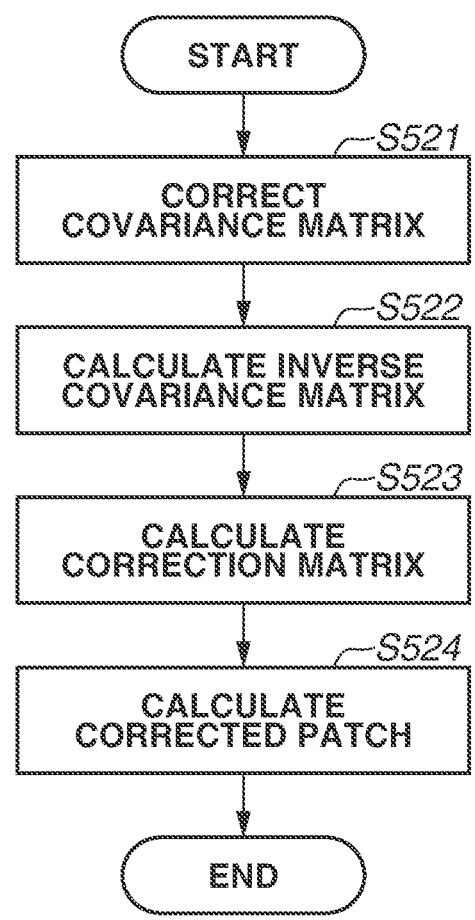

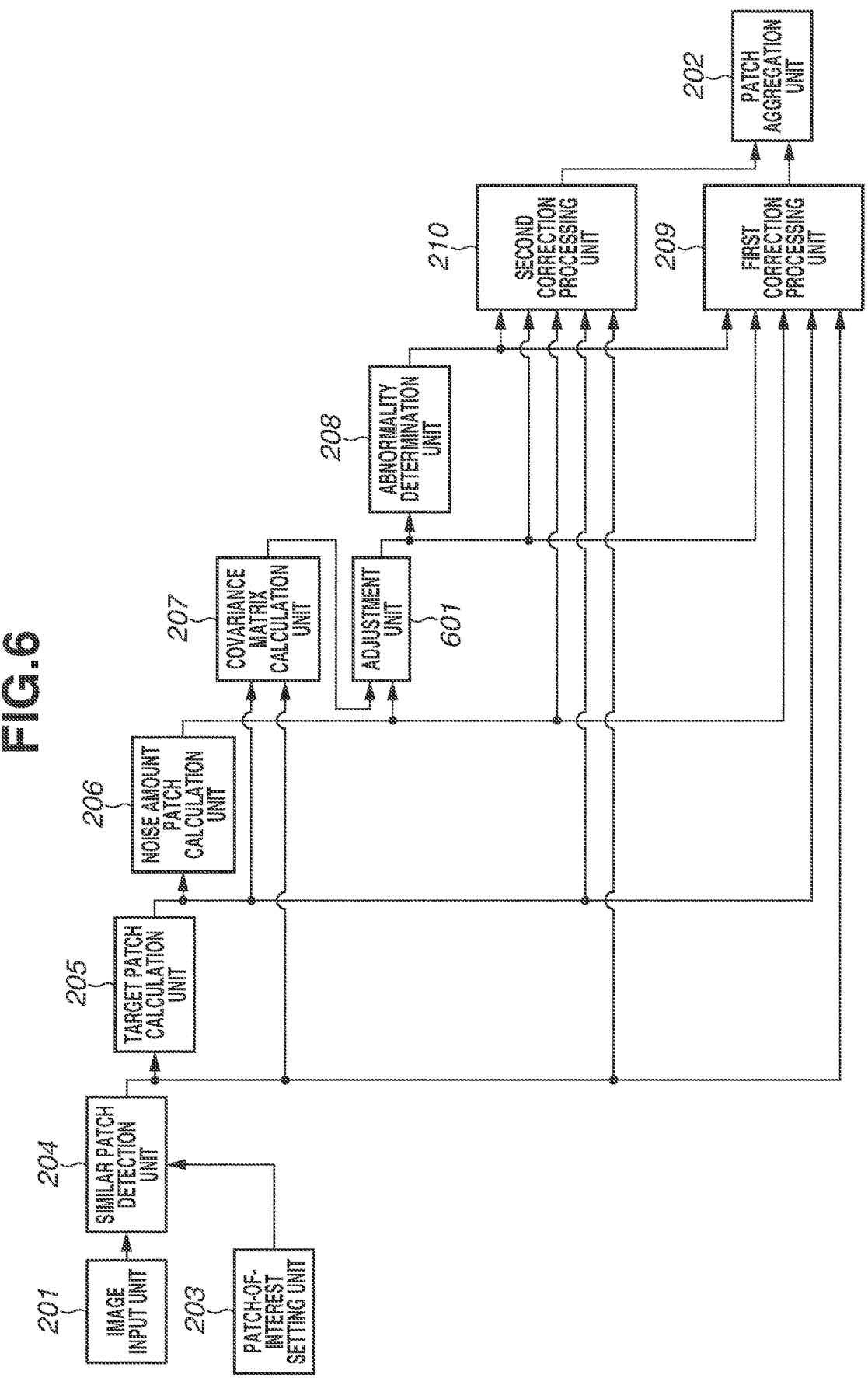

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to an image processing apparatus that reduces noise of an image, an image processing method, and a storage medium.

Description of the Related Art

There is a conventionally known technology of patch-based noise reduction with a focus on a patch including a plurality of pixels of an image captured by a camera to suppress noise contained in the image. In the process discussed in Implementation of the "Non-Local Bayes" (NL-Bayes) Image Denoising Algorithm, Image Processing On Line, 3 (2013), pp. 1-42, a patch set including patches of a captured image is selected, a probability model of a patch represented by an average of the patch set and a covariance matrix is generated, and noise reduction processing is performed on each of the patches constituting the patch set based on maximum posteriori probability. Subsequently, an output image is generated using a patch having undergone the noise reduction processing. Here, an inverse covariance matrix, which is an inverse matrix of the covariance matrix, is calculated, and a pixel value having undergone the noise reduction processing is determined based on the inverse covariance matrix.

Unfortunately, with the conventional technology, the value of a pixel in the patch having undergone the noise reduction processing may be an abnormal value and, as a result, an output image may be corrupted.

SUMMARY OF THE DISCLOSURE

An image processing apparatus includes a setting unit configured to set a plurality of patches in the image, a calculation unit configured to calculate a covariance matrix based on the plurality of patches, a determination unit configured to determine whether the covariance matrix is abnormal, a first correction unit configured to, in a case where the determination unit determines that the covariance matrix is not abnormal, use the covariance matrix to perform first correction on a pixel included in the plurality of patches to acquire a first correction pixel, a second correction unit configured to, in a case where the determination unit determines that the covariance matrix is abnormal, perform second correction on a pixel included in the plurality of patches to acquire a second correction pixel, and a generation unit configured to generate an output image with the first correction pixel or the second correction pixel.

Further features of the disclosure will become apparent from the following description of exemplary embodiments with reference to the attached drawings.

BRIEF DESCRIPTION OF THE DRAWINGS

FIGS. 5A and 5B are flowcharts of first correction processing and second correction processing, respectively, according to the first exemplary embodiment.

FIG. 6 is a block diagram of image processing according to a second exemplary embodiment.

DESCRIPTION OF THE EMBODIMENTS

According to a first exemplary embodiment, a method for determining abnormality of a covariance matrix in patch-based noise reduction processing to avoid the corruption of an output image in a case of the abnormality is described.

Figure 1:
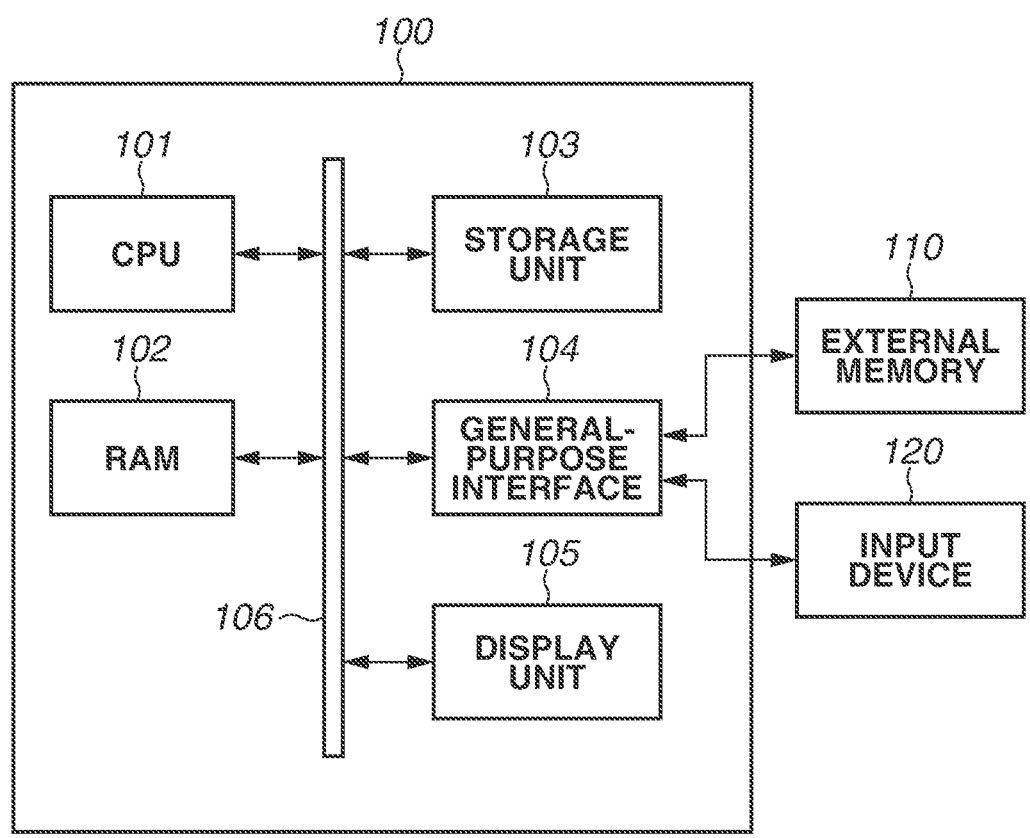
FIG. 1 is a block diagram illustrating a hardware configuration according to a first exemplary embodiment.

FIG. 1 is a block diagram illustrating a hardware configuration according to the present exemplary embodiment. In FIG. 1, an image processing apparatus 100 includes a central processing unit (CPU) 101, a random-access memory (RAM) 102, a storage unit 103, a general-purpose interface 104, and a display unit 105. The CPU 101, the RAM 102, the storage unit 103, the general-purpose interface 104, and the display unit 105 are connected to each other via a main bus 106. An external memory 110 and an input device 120, such as a mouse and a keyboard, are connected to the main bus 106 via the general-purpose interface 104. The storage unit 103 is a storage device such as a hard disk drive (HDD) or a solid-state drive (SSD). The display unit 105 is a liquid crystal display, an organic electroluminescence (EL) display, etc.

Various types of processing performed by the CPU 101 operating various types of software (computer programs) stored in the storage unit 103 are described below. First, the CPU 101 starts an image processing program stored in the storage unit 103 and loads the image processing program into the RAM 102. At the same time, the CPU 101 causes the display unit 105 to present a user interface window (hereinafter referred to as a "UI window"). Then, in accordance with an instruction from the user via the input device 120, input image data stored in the external memory 110 is loaded into the RAM 102. Further, in accordance with an instruction from the user, noise reduction processing is performed on the input image data stored in the RAM 102. The image data having undergone the noise reduction processing is stored in the RAM 102 again. The image data having undergone the noise reduction processing and stored in the RAM 102 is subjected to a series of operations in accordance with an instruction from the user and is then used for predetermined output to be presented on the display unit 105 or stored in the external memory 110. The input image data targeted for the noise reduction processing can be stored in the storage unit 103 as well as the external memory 110, or can be loaded from a server into the RAM 102 via a network (not illustrated).

An outline of the patch-based noise reduction processing is described. A partial image obtained by clipping a part of input image data is referred to as a patch. A plurality of patches present in a predetermined reference area near a patch of interest are referred to as reference patches. The reference patches are referred to when the noise reduction processing corresponding to the patch of interest is performed. In the patch-based noise reduction processing, patches included in the reference patches and having a similar pixel value distribution to the pixel value distribution of the patch of interest are detected as similar patches. The similar patches are used as a patch set. The reference patches can include the patch of interest itself. Based on the patch set, the noise reduction processing is executed on each similar patch. By aggregating the similar patches whose noise has been reduced, an image having undergone the noise reduction processing is generated for the input image data.

Figure 2:
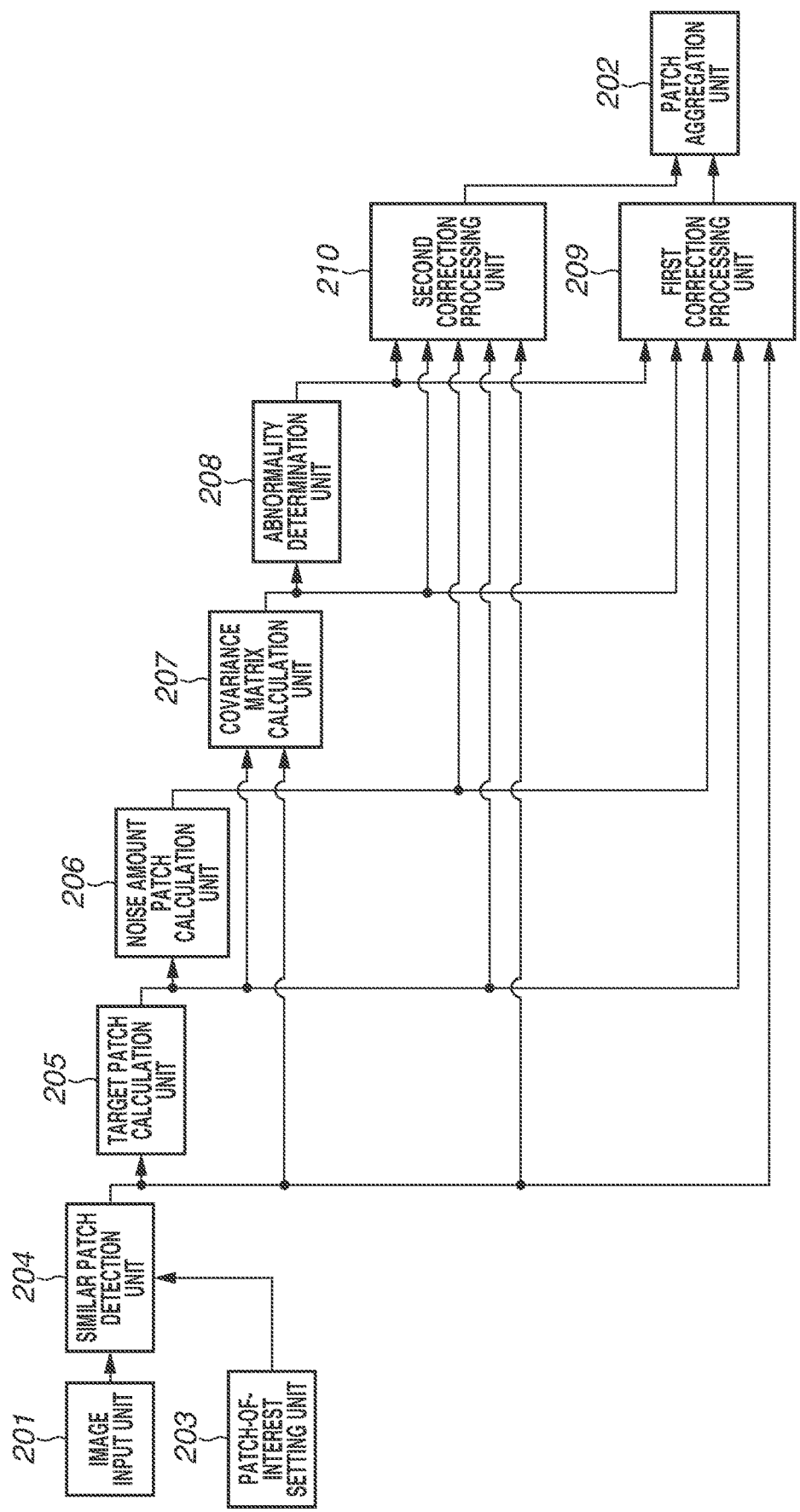
FIG. 2 is a block diagram of image processing according to the first exemplary embodiment.

FIG. 2 is a block diagram of image processing according to the present exemplary embodiment. An image input unit 201 acquires input image data. A patch aggregation unit 202 aggregates a plurality of corrected similar patches to generate an output image whose noise has been reduced. A patch-of-interest setting unit 203 clips a partial image having a predetermined shape from the input image data to use the partial image as a patch of interest. According to the present exemplary embodiment, the predetermined shape is a square of 6 pixels×6 pixels. A similar patch detection unit 204 sets a plurality of patches present in a predetermined reference area near the patch of interest as reference patches, and detects, as similar patches, a patch that is included in the reference patches and that is similar to the patch of interest. Each reference patch has the shape identical to the shape of the patch of interest. A target patch calculation unit 205 calculates a target patch based on the plurality of similar patches. A noise amount patch calculation unit 206 calculates a noise amount patch based on the plurality of similar patches. A covariance matrix calculation unit 207 calculates a covariance matrix based on the plurality of similar patches. An abnormality determination unit 208 determines whether the covariance matrix is abnormal (normal). A first correction processing unit 209 corrects the plurality of similar patches in a case where it is determined that the covariance matrix is normal. A second correction processing unit 210 corrects the plurality of similar patches in a case where it is determined that the covariance matrix is abnormal.

The exemplary embodiment of the disclosure is characterized in that the abnormality determination unit 208 is provided to determine abnormality of a covariance matrix and different processing is performed in accordance with a determination result. In the description according to the present exemplary embodiment, the two different correction processing units are provided and the correction results by the two correction processing units are selectively used based on a determination result of the abnormality determination unit 208. More specifically, in a case where it is determined that the covariance matrix is normal, the first correction processing unit 209 performs the usual "patch-based noise reduction processing". Conversely, in a case where it is determined that the covariance matrix is abnormal, the second correction processing unit 210 corrects the covariance matrix and then performs the usual "patch-based noise reduction processing".

Figure 3:
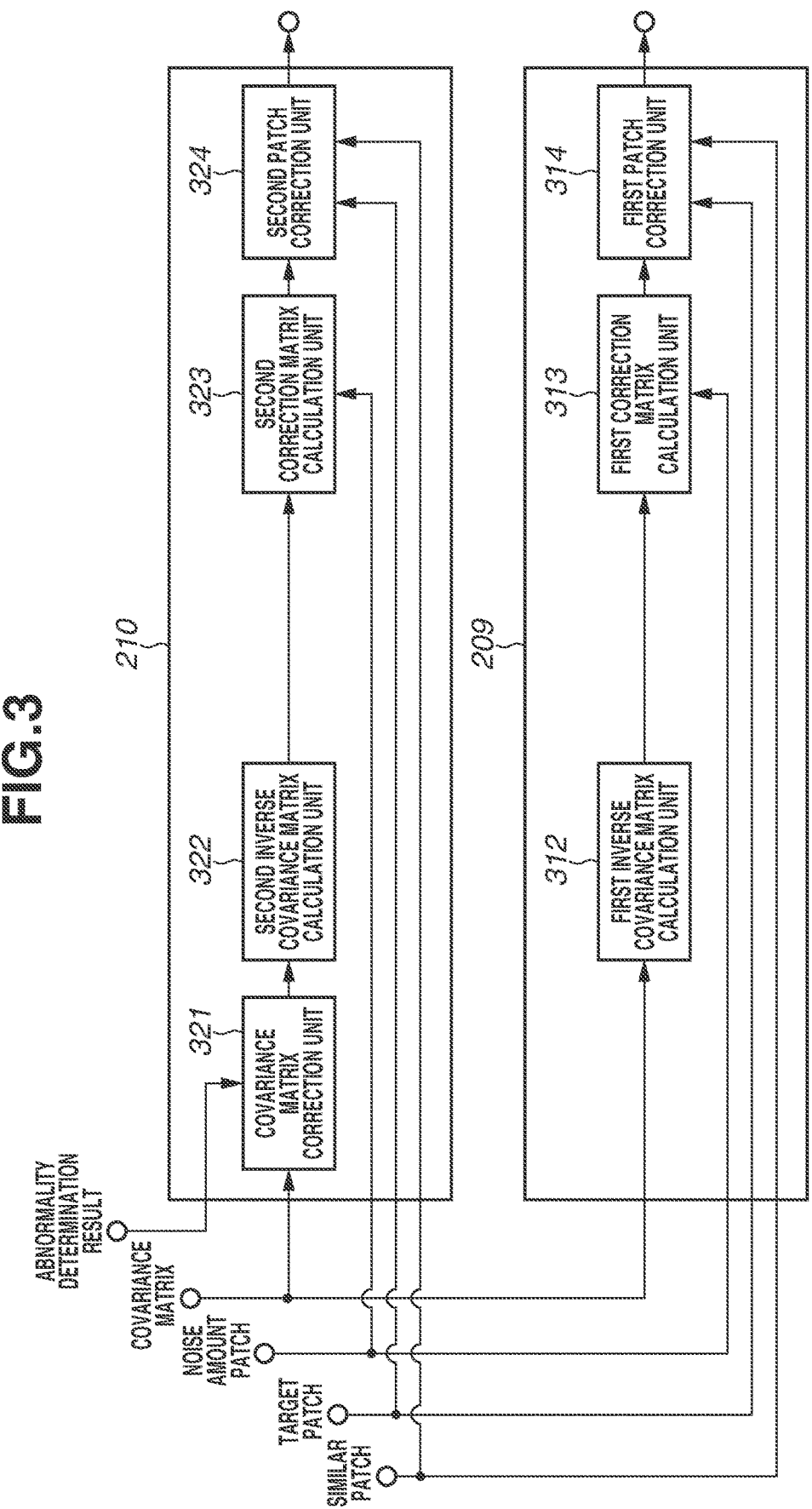
FIG. 3 is a block diagram illustrating more detailed functions of a first correction processing unit and a second correction processing unit according to the first exemplary embodiment.

FIG. 3 is a block diagram of image processing in which functions of the first correction processing unit 209 and the second correction processing unit 210 according to the present exemplary embodiment are illustrated in more detail. A first inverse covariance matrix calculation unit 312 calculates an inverse covariance matrix, which is an inverse matrix of a covariance matrix. A first correction matrix calculation unit 313 calculates a correction matrix based on the inverse covariance matrix and the noise amount patch. A first patch correction unit 314 corrects each of the plurality of similar patches based on the correction matrix and the target patch. A covariance matrix correction unit 321 corrects the covariance matrix based on the determination result of the abnormality determination unit 208. A second inverse covariance matrix calculation unit 322 calculates an inverse covariance matrix, which is an inverse matrix of a covariance matrix. A second correction matrix calculation unit 323 calculates a correction matrix based on the inverse covariance matrix and the noise amount patch. A second patch correction unit 324 corrects each of the plurality of similar patches based on the correction matrix and the target patch.

Figure 4:
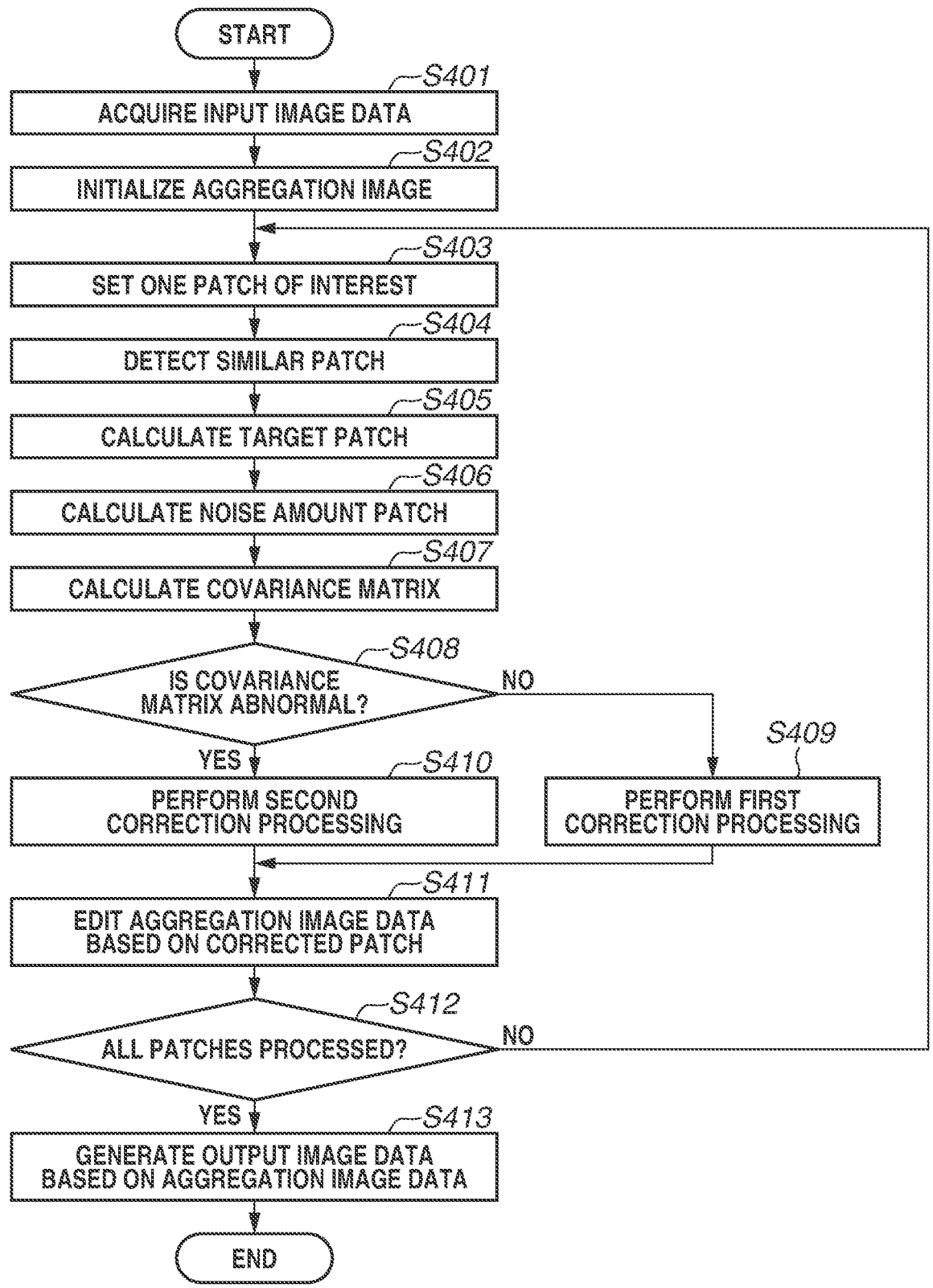
FIG. 4 is a flowchart of image processing according to the first exemplary embodiment.

FIG. 4 is a flowchart of image processing according to the present exemplary embodiment.

In step S401, the image input unit 201 acquires input image data.

In step S402, the patch aggregation unit 202 initializes aggregation image data to zero. The aggregation image data includes denominator image data and numerator image data, both of which have the number of pixels identical to the number of pixels of the input image data.

In step S403, the patch-of-interest setting unit 203 sets one patch of interest. Typically, a plurality of patches can be set as the patches of interest for a piece of input image data. The processing after step S403 is repeatedly performed while a position of the patch of interest to be set is changed. Here, all patches can be set as the patch of interest once, or only some of the patches can be set as the patch of interest. According to the present exemplary embodiment, all the patches are set as the patch of interest, starting from an upper left patch, in the order of a raster scan. As described above, according to the present exemplary embodiment, a square partial image of 6 pixels×6 pixels is clipped from the input image data and is used as the patch of interest. That is, the patch of interest includes 36 pixels. The patch of interest is represented below as a column vector T in which 36 pixels are vertically arranged. Typically, in a case where the patch of interest includes M pixels, the patch of interest is represented as the column vector T in which the M pixels are vertically arranged.

In step S404, the similar patch detection unit 204 detects a similar patch.

A plurality of patches present in a predetermined reference area near the patch T of interest are set as reference patches. The shape of each reference patch matches the shape of the patch T of interest. An i-th reference patch is represented below as a column vector R_i in which the M pixels are vertically arranged.

Subsequently, the degree of similarity between each of the reference patches and the patch T of interest is calculated. The degree of similarity is calculated using a sum of squared differences (SSD) of pixels in the reference patch and the patch T of interest. Specifically, a degree of similarity SSD_i of the i-th reference patch R_i is calculated by an Equation (1) below.

$$SSD_i = \|R_i - T\|^2 = \sum_{j=1}^{M} (R_i(j) - T(j))^2 \quad \text{Equation (1)}$$

where a j-th component (pixel value) of the vector T is denoted by T(j). As it is understood from this calculation method, a smaller value of the degree of similarity SSD_i means that the reference patch R_i is similar to the patch T of interest. Some patches are further detected as similar patches from the reference patches based on the degree of similarity. According to the present exemplary embodiment, a patch having a degree of similarity lower than a predetermined threshold is detected as a similar patch. The number of similar patches detected here is N, and the i-th similar patch is represented by P_i.

In step S405, the target patch calculation unit 205 calculates a target patch Q based on the plurality of similar patches by Equation (2) below.

$$Q = \frac{1}{N}\sum_{i=1}^{N} P_i \qquad \text{Equation (2)}$$

In step S406, the noise amount patch calculation unit 206 calculates a noise amount patch V using the patch T of interest according to Equation (3) below.

$$V = kT + V_0 \qquad \text{Equation (3)}$$

where k is a constant, V_0 is a vector having a shape identical to that of the target patch Q, and k and V_0 are previously set and saved.

In step S407, the covariance matrix calculation unit 207 calculates a covariance matrix based on the plurality of similar patches. A covariance matrix C is calculated using the target patch Q calculated in step S405, according to Equation (4) below.

$$C = \frac{1}{N-1}\sum_{i=1}^{N}(P_i - Q)(P_i - Q)^t \qquad \text{Equation (4)}$$

where calculation is performed as a matrix while a vector representing a patch is regarded as a matrix, and t is a transpose of the matrix.

In step S408, the abnormality determination unit 208 determines whether the covariance matrix C is abnormal. First, each diagonal component of the covariance matrix C is compared with a predetermined threshold Thre. In a case where the diagonal component is larger than the threshold, it is determined that the diagonal component is normal. In a case where the diagonal component is not larger than the threshold, it is determined that the diagonal component is abnormal. The abnormality determination unit 208 includes a diagonal component determination unit (not illustrated) that performs this determination process. Subsequently, in a case where it is determined that all the diagonal components are normal, it is determined that the covariance matrix C is normal. In a case where it is determined that all the diagonal components are not normal, it is determined that the covariance matrix C is abnormal. The abnormality determination unit 208 includes a matrix determination unit (not illustrated) that performs this determination process.

In a case where it is determined that the covariance matrix C is abnormal (Yes in step S408), in step S410, the second correction processing unit 210 performs second correction processing. FIG. 5B is a flowchart of the second correction processing.

In step S521, the covariance matrix correction unit 321 corrects the covariance matrix C. The details of the processing to correct the covariance matrix C are described below.

In step S522, the second inverse covariance matrix calculation unit 322 calculates an inverse covariance matrix $C^{-1}$ that is an inverse matrix of the covariance matrix C corrected in step S521.

In step S523, the second correction matrix calculation unit 323 calculates a correction matrix H by Equation (5) below.

$$H = \text{diag}(V)C^{-1} \qquad \text{Equation (5)}$$

where diag(V) denotes a square diagonal matrix having an element of a vector V on a principal diagonal.

In step S524, the second patch correction unit 324 calculates a corrected patch O_i including a correction pixel corresponding to each of the plurality of similar patches P_i according to Equation (6) below.

$$O_i = P_i - H(P_i - Q) \qquad \text{Equation (6)}$$

In a case where it is determined that the covariance matrix C is normal (No in step S408), in step S409, the first correction processing unit 209 performs first correction processing. FIG. 5A is a flowchart of the first correction processing.

As the first correction processing is the same as the second correction processing except that the covariance matrix C is corrected in step S521, the descriptions are omitted.

In step S411, the patch aggregation unit 202 edits the aggregation image data based on the plurality of corrected patches. As described above, the aggregation image data includes the denominator image data and the numerator image data. With regard to each of the plurality of corrected patches O_i, the values of all the pixels are added to the corresponding positions in the numerator image data. This position is a position where each pixel is present in the input image data. The value "1" is added to the same position in the denominator image data.

In step S412, it is determined whether all the patches of interest have been processed. In a case where all the patches of interest have been processed (Yes in step S412), the processing proceeds to step S413. In a case where all the patches of interest have not been processed (No in step S412), the processing proceeds to step S403.

In step S413, the patch aggregation unit 202 generates output image data based on the aggregation image data. Each pixel value of the numerator image data is divided by the corresponding pixel value of the denominator image data to obtain output image data.

An example of the processing performed by the covariance matrix correction unit 321 to correct the covariance matrix C is described in detail. A j-th diagonal component of the covariance matrix C is described as d_j, and the corrected j-th diagonal component is described as e_j. In a case where it is determined that d_j is abnormal in step S408, the corrected e_j is calculated by Equation (7) below.

$$e_j = d_j \times \left(\frac{Thre}{d_j}\right)^r \qquad \text{Equation (7)}$$

where Thre is a threshold identical to the threshold used in step S408, and r is a constant and is previously set and saved.

In a case where it is determined that d_j is normal in step S408, the corrected e_j is calculated by Equation (8) below.

$$e_j = d_j \qquad \text{Equation (8)}$$

This means that, when d_j is normal, the value is not changed (not corrected) before and after the correction.

The flow of the image processing according to the present exemplary embodiment has been described above.

The above processing makes it possible to correct abnormality even when the abnormality occurs in a covariance matrix and to obtain a suitable output image.

The processing according to the present exemplary embodiment is applicable to image data with various formats. The processing is applicable to, for example, a monochrome image, a color image including multiple color components, and an image with the Bayer arrangement.

Although the degree of similarity between the reference patch and the patch T of interest is calculated using the sum of squared differences (SSD) of pixels, the degree of similarity can be calculated by another method. For example, the degree of similarity can be calculated using a sum of absolute differences (SAD) of pixels. The degree of similarity can be calculated using, for example, a maximum value, a minimum value, an average value, or a median value of the absolute differences of pixels.

Although it is determined that the covariance matrix C is normal in a case where it is determined that all the diagonal components are normal, this is not a limitation. For example, it can be determined that the covariance matrix C is normal in a case where the number of diagonal components determined to be normal is more than a predetermined number.

The threshold Thre used to determine whether a diagonal component of the covariance matrix C is abnormal in step S408 can be always the identical value or can be different depending on various parameters. The threshold Thre can be calculated based on at least any one of the average value, the median value, and a mode value of the pixels included in the plurality of similar patches. A threshold Thre_j to be used to make a determination for the j-th diagonal component of the covariance matrix C can be changed in accordance with a j-th component Q(j) of the target patch Q. In this case, there is a method in which, for example, Thre_j is increased as Q(j) is larger.

Although the corrected e_j is calculated by Equation (7) in the processing in which the covariance matrix correction unit 321 corrects the covariance matrix C, the corrected e_j can be determined by another method. For example, the corrected e_j can be calculated by another equation or can be determined by a look-up table. In this case, the corrected e_j (in a broad sense) monotonically decreases with respect to the uncorrected d_j and is determined so as to be continuous with Equation (8) when e_j=Thre.

In addition to the correction using Equation (7) described above, a non-diagonal component can be corrected. For example, all the non-diagonal components can be replaced with zero, or only the non-diagonal component orthogonal to d_j, which is determined to be abnormal in step S408, may be replaced with zero.

Although a target patch is calculated using the average value of the plurality of similar patches, this is not a limitation. For example, a value of each pixel of a target patch can be determined using the median value or the minimum value of the corresponding pixels of the plurality of similar patches.

The abnormality determination unit 208 is provided to determine whether a covariance matrix is abnormal and, in a case where it is determined that the covariance matrix is normal, the usual "patch-based noise reduction processing" is performed. Conversely, in a case where it is determined that the covariance matrix is abnormal, correction processing different from the usual "patch-based noise reduction processing" is performed, which is a primary aim of the present exemplary embodiment. The correction processing is not limited to the one described according to the present exemplary embodiment. For example, there is a method in which a corrected patch is calculated as the similar patch to be corrected, the target patch, or the linear sum thereof.

A method described according to a second exemplary embodiment is to perform, in addition to the processing according to the first exemplary embodiment, processing to adjust a covariance matrix to perform the processing to determine whether the covariance matrix is abnormal with higher accuracy. The description of the parts common to the first exemplary embodiment is omitted.

An amount of noise contained in the input image data varies or may vary depending on the pixel value at the corresponding pixel position. In the example described according to the present exemplary embodiment, the processing is performed to determine whether the covariance matrix is abnormal after the covariance matrix is previously adjusted by the noise amount patch, whereby a more accurate determination is made by the identical processing regardless of the luminance dependency of noise. In one embodiment, the adjustment at an appropriate timing after the determination processing is canceled.

FIG. 6 is a block diagram of image processing according to the present exemplary embodiment. An adjustment unit 601 is added to the configuration according to the first exemplary embodiment illustrated in FIG. 2. The adjustment unit 601 adjusts a covariance matrix based on the noise amount patch.

Figure 7:
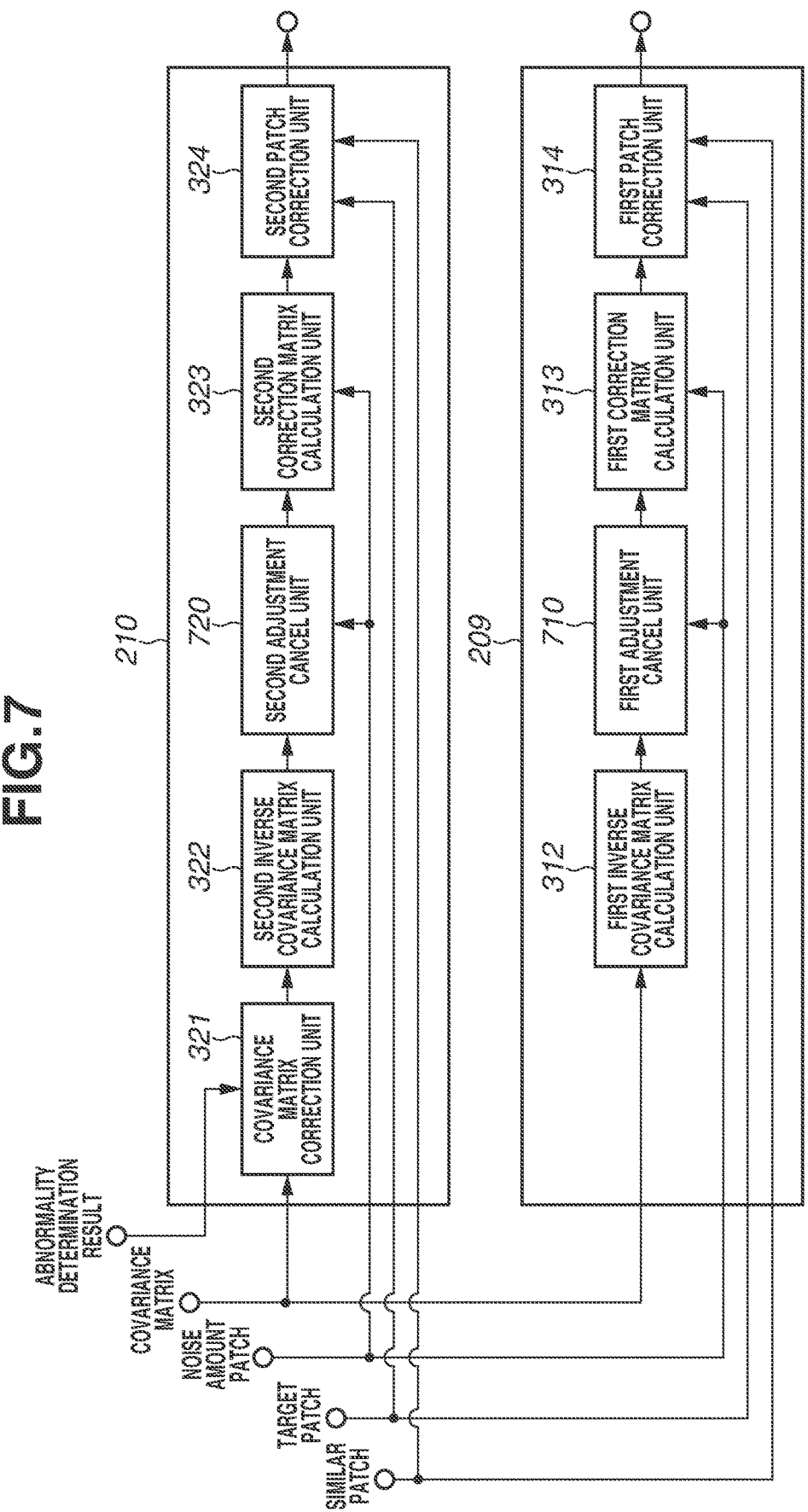
FIG. 7 is a block diagram illustrating more detailed functions of the first correction processing unit and the second correction processing unit according to the second exemplary embodiment.

FIG. 7 is a block diagram of image processing in which functions of the first correction processing unit 209 and the second correction processing unit 210 according to the present exemplary embodiment are illustrated in more detail. A first adjustment cancel unit 710 and a second adjustment cancel unit 720 are added to the configuration according to the first exemplary embodiment illustrated in FIG. 3. The first adjustment cancel unit 710 and the second adjustment cancel unit 720 cancel the adjustment of an inverse covariance matrix based on the noise amount patch.

Figure 8:
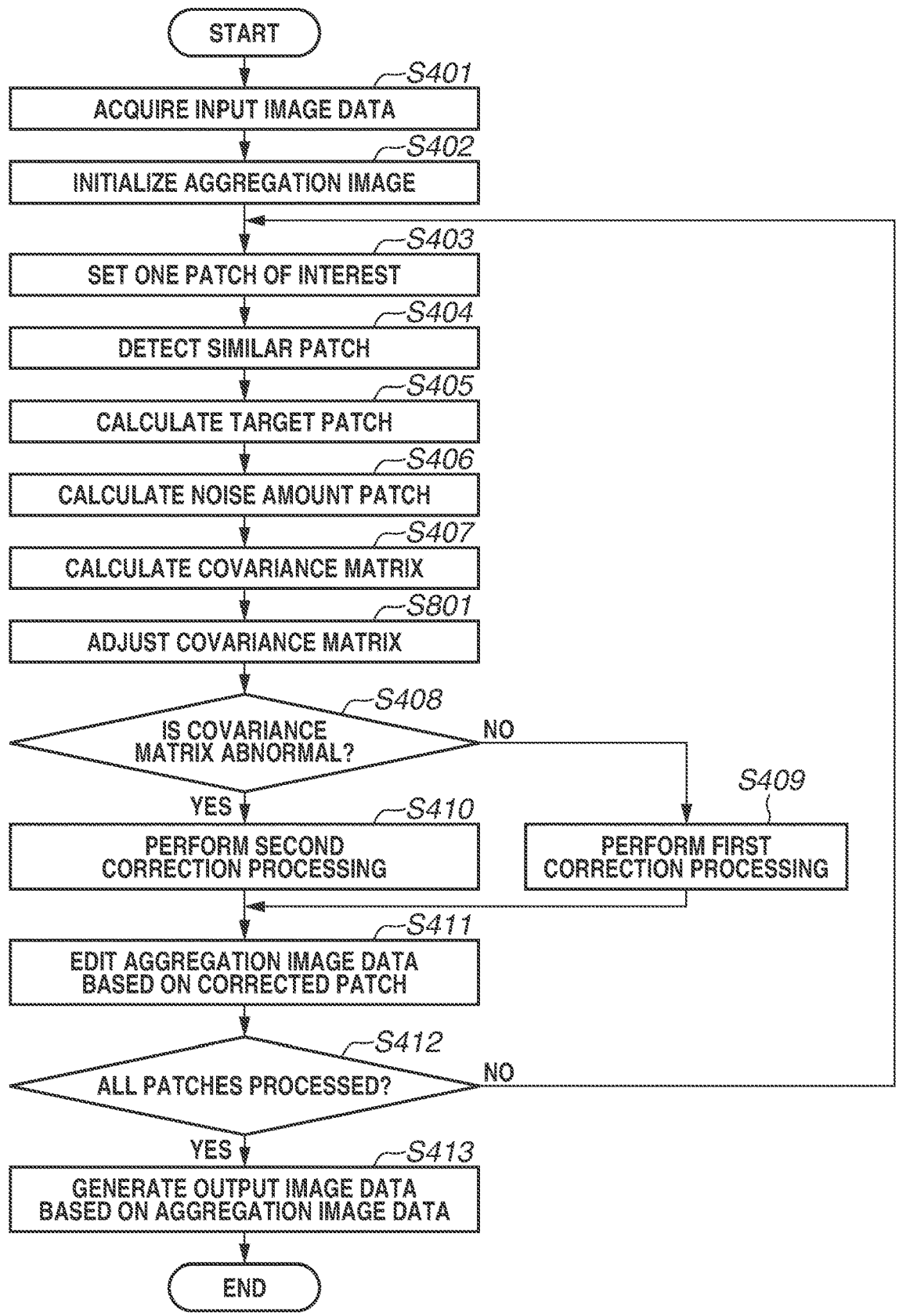
FIG. 8 is a flowchart of image processing according to the second exemplary embodiment.

FIG. 8 is a flowchart of image processing according to the present exemplary embodiment. Step S801 is added to the flowchart according to the first exemplary embodiment illustrated in FIG. 4, and the contents in step S409 and step S410 have been changed.

In step S801, the adjustment unit 601 adjusts the covariance matrix C based on the noise amount patch V. First, an adjustment patch A is calculated by Equation (9) below based on the noise amount patch V.

$$A(j) = \frac{1}{\sqrt{V(j)}} \qquad \text{Equation (9)}$$

Here, in a case where the value of V(j) is smaller than a predetermined positive threshold, the value is replaced with another value to avoid the calculation of the square root of a negative number or the division by zero.

Subsequently, the adjustment patch A is used to adjust the covariance matrix C according to Equation (10) described below to calculate an adjusted covariance matrix C_1.

$$C_1 = \text{diag}(A) \cdot C \, \text{diag}(A) \qquad \text{Equation (10)}$$

where • is the product of matrices.

Figure 9A:
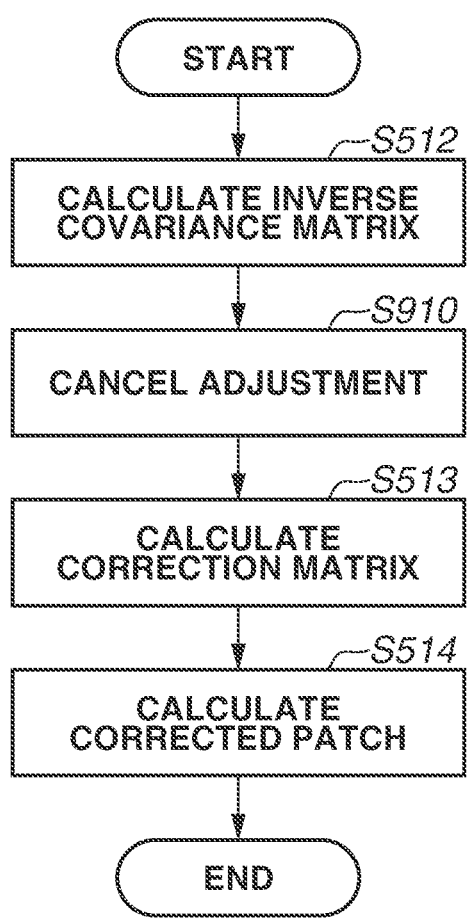
FIGS. 9A and 9B are flowcharts of first correction processing and second correction processing, respectively, according to the second exemplary embodiment.
Figure 9B:
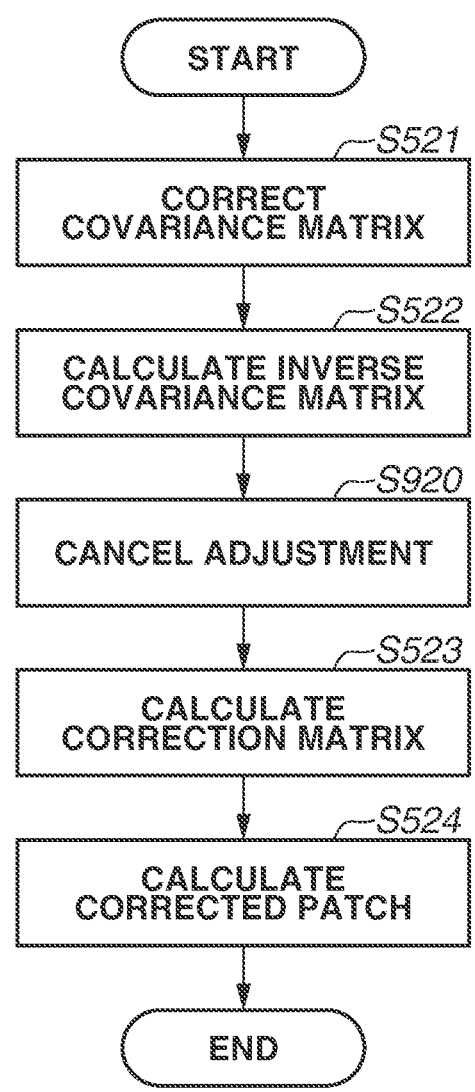

FIG. 9B is a flowchart of the second correction processing according to the present exemplary embodiment.

In step S521, the covariance matrix correction unit 321 corrects the adjusted covariance matrix C_1. This processing is the same as the processing according to the first exemplary embodiment except that the covariance matrix to be corrected has been adjusted.

In step S522, the second inverse covariance matrix calculation unit 322 calculates an adjusted inverse covariance matrix $(C\_1)\hat{\ }-1$, which is the inverse matrix of the adjusted covariance matrix C_1 corrected in step S521.

In step S920, the second adjustment cancel unit 720 cancels the adjustment of the adjusted inverse covariance matrix $(C\_1)\hat{\ }-1$. Specifically, the adjustment patch A calculated by Equation (9) is used to cancel the adjustment of the adjusted inverse covariance matrix $(C\_1)\hat{\ }-1$ by Equation (11) below to calculate an inverse covariance matrix $\hat{C}-1$.

$$C^{-1} = \text{diag}(A) \cdot C_1^{-1} \cdot \text{diag}(A) \qquad \text{Equation (11)}$$

The contents of the processing in step S523 are the same as the contents according to the first exemplary embodiment.

The contents of the processing in step S524 are the same as the contents according to the first exemplary embodiment.

The above processing makes it possible to correct abnormality of a covariance matrix more accurately by the identical processing regardless of the luminance dependency of noise and to obtain a suitable output image.

Although the adjustment patch A is calculated by Equation (9), this is not a limitation. The adjustment patch A can be calculated by another equation or can be calculated by a table generated in advance. The adjustment patch A can be calculated based on the target patch instead of the noise amount patch.

The exemplary embodiments of the disclosure can be implemented in various forms without departing from the technical idea or the primary features thereof. For example, a part of a quadratic function coefficient calculation unit is operated in accordance with a calculation start signal given by a higher-level control unit, a calculation result is stored, and the data stored here is simply referred to while an image is input, whereby reducing electric power.

According to the present disclosure, it is possible to suppress the corruption of an output image having undergone the noise reduction processing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-022179, filed Feb. 13, 2020, which is hereby incorporated by reference herein in its entirety.

What is claimed is:

1. An apparatus comprising:
   at least one processor; and
   a memory that stores a program which, when executed by the at least one processor, causes the at least one processor to function as:
   a setting unit configured to set a plurality of patches in an image;
   a calculation unit configured to calculate a covariance matrix based on the plurality of patches;
   a first determination unit configured to determine whether the covariance matrix is abnormal;
   a first correction unit configured to, in a case where the first determination unit determines that the covariance matrix is not abnormal, use the covariance matrix to perform first correction on a pixel included in the plurality of patches to acquire a first correction pixel;
   a second correction unit configured to, in a case where the first determination unit determines that the covariance matrix is abnormal, perform second correction on a pixel included in the plurality of patches to acquire a second correction pixel; and
   a generation unit configured to generate an output image with the first correction pixel or the second correction pixel.

2. The apparatus according to claim 1,
   wherein the first determination unit includes a second determination unit configured to determine whether each diagonal component included in the covariance matrix is abnormal, and
   wherein it is determined whether the covariance matrix is abnormal based on a determination of the second determination unit.

3. The apparatus according to claim 2, wherein the second determination unit compares each of diagonal components included in the covariance matrix with a predetermined threshold and determines that the diagonal component is abnormal, in a case where the diagonal component is smaller than the predetermined threshold.

4. The apparatus according to claim 1, wherein the second correction unit corrects the covariance matrix and uses the corrected covariance matrix to perform the second correction on a pixel included in the plurality of patches to acquire the second correction pixel.

5. The apparatus according to claim 2, wherein the second correction unit replaces a diagonal component included in the covariance matrix with another value to correct the covariance matrix and uses the corrected covariance matrix to perform the second correction on a pixel included in the plurality of patches to acquire the second correction pixel.

6. The apparatus according to claim 3, wherein the second correction unit replaces a diagonal component included in the covariance matrix with another value to correct the covariance matrix and uses the corrected covariance matrix to perform the second correction on a pixel included in the plurality of patches to acquire the second correction pixel.

7. The apparatus according to claim 5, wherein the second correction unit replaces a non-diagonal component orthogonal to a diagonal component included in the covariance matrix with another value.

8. The apparatus according to claim 3, wherein the first determination unit calculates the predetermined threshold based on the plurality of patches.

9. The apparatus according to claim 3, wherein the first determination unit calculates the predetermined threshold based on at least any one of an average value, a median value, and a mode value of pixels included in the plurality of patches.

10. The apparatus according to claim 1, wherein the first determination unit adjusts the covariance matrix to eliminate luminance dependency of noise and determines whether the adjusted covariance matrix is abnormal.

11. A method comprising:
setting a plurality of patches in an image;
calculating a covariance matrix based on the plurality of patches;
determining whether the covariance matrix is abnormal;
in a case where it is determined that the covariance matrix is not abnormal in the determining, using the covariance matrix to perform first correction on a pixel included in the plurality of patches to acquire a first correction pixel;
in a case where it is determined that the covariance matrix is abnormal in the determining, performing second correction on a pixel included in the plurality of patches to acquire a second correction pixel, the second correction being different from the first correction; and
generating an output image with the first correction pixel or the second correction pixel.

12. The method according to claim 11,
wherein the determining includes second determining whether each diagonal component included in the covariance matrix is abnormal, and
wherein it is determined whether the covariance matrix is abnormal based on a determination of the second determining.

13. The method according to claim 12, wherein the second determining compares each of diagonal components included in the covariance matrix with a predetermined threshold and determines that the diagonal component is abnormal, in a case where the diagonal component is smaller than the predetermined threshold.

14. The method according to claim 11, further comprising correcting the covariance matrix and using the corrected covariance matrix to perform the second correction on a pixel included in the plurality of patches to acquire the second correction pixel.

15. The method according to claim 11, wherein the first determining adjusts the covariance matrix to eliminate luminance dependency of noise and determines whether the adjusted covariance matrix is abnormal.

16. A non-transitory computer-readable storage medium storing instructions that, when executed by a computer, cause the computer to perform a method comprising:
setting a plurality of patches in the image;
calculating a covariance matrix based on the plurality of patches;
determining whether the covariance matrix is abnormal;
in a case where it is determined that the covariance matrix is not abnormal in the determining, using the covariance matrix to perform first correction on a pixel included in the plurality of patches to acquire a first correction pixel;
in a case where it is determined that the covariance matrix is abnormal in the determining, performing second correction on a pixel included in the plurality of patches to acquire a second correction pixel, the second correction being different from the first correction; and
generating an output image with the first correction pixel or the second correction pixel.

17. The non-transitory computer-readable storage medium according to claim 16,
wherein the determining includes second determining whether each diagonal component included in the covariance matrix is abnormal, and
wherein it is determined whether the covariance matrix is abnormal based on a determination of the second determining.

18. The non-transitory computer-readable storage medium according to claim 17, wherein the second determining compares each of diagonal components included in the covariance matrix with a predetermined threshold and determines that the diagonal component is abnormal, in a case where the diagonal component is smaller than the predetermined threshold.

19. The non-transitory computer-readable storage medium according to claim 16, further comprising correcting the covariance matrix and using the corrected covariance matrix to perform the second correction on a pixel included in the plurality of patches to acquire the second correction pixel.

20. The non-transitory computer-readable storage medium according to claim 16, wherein the first determining adjusts the covariance matrix to eliminate luminance dependency of noise and determines whether the adjusted covariance matrix is abnormal.

* * * * *